T. B. FUNK.
DRAFT APPLIANCE FOR TRACTORS.
APPLICATION FILED JUNE 18, 1920.
Reissued Nov. 16, 1920.
14,985.
2 SHEETS—SHEET 1.
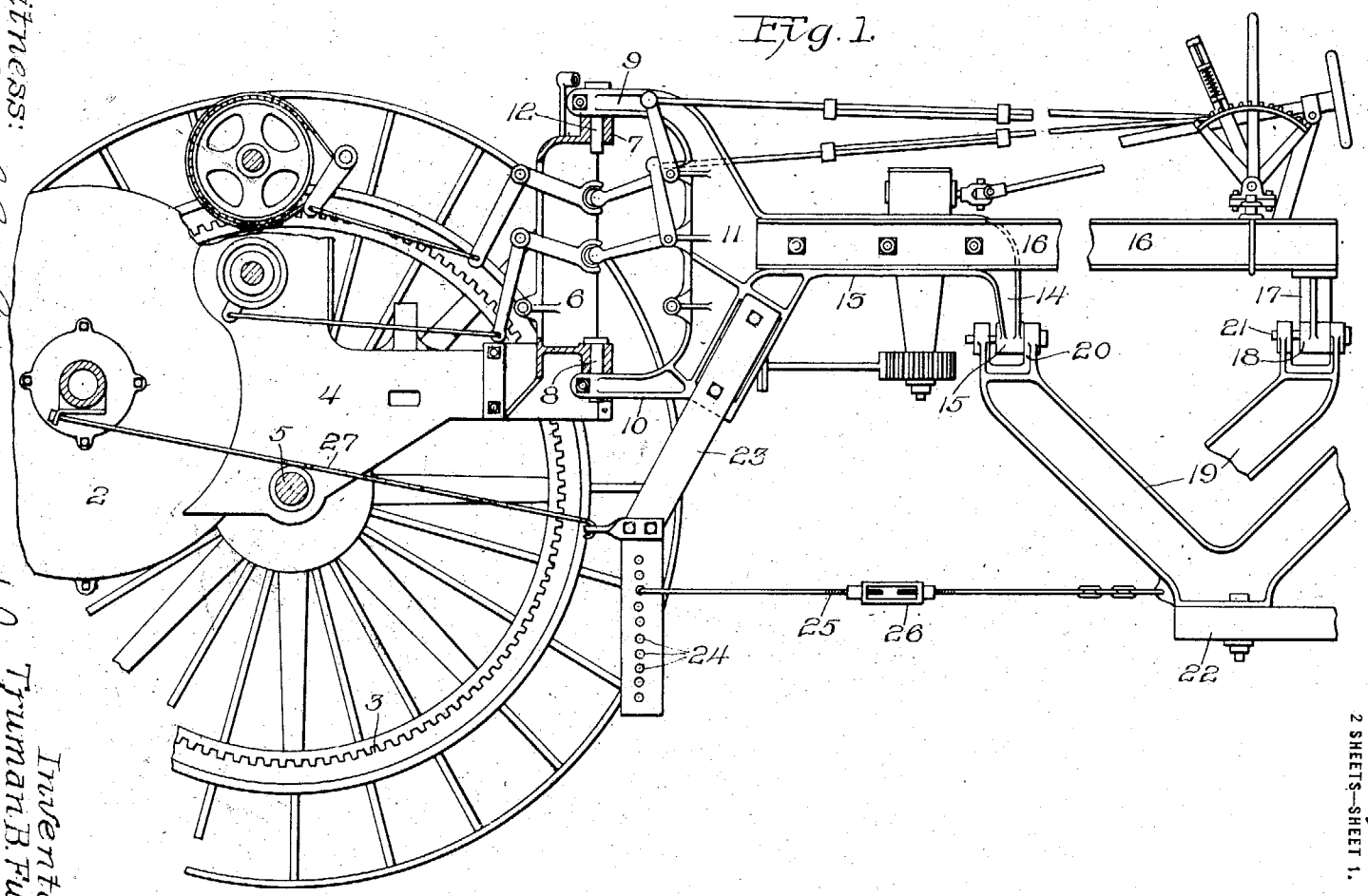
Witness:
Harry S. Gaither
Inventor:
Truman B. Funk
by L. C. Shonts
Attys.

T. B. FUNK.
DRAFT APPLIANCE FOR TRACTORS.
APPLICATION FILED JUNE 18, 1920.
Reissued Nov. 16, 1920.
14,985.
2 SHEETS—SHEET 2.
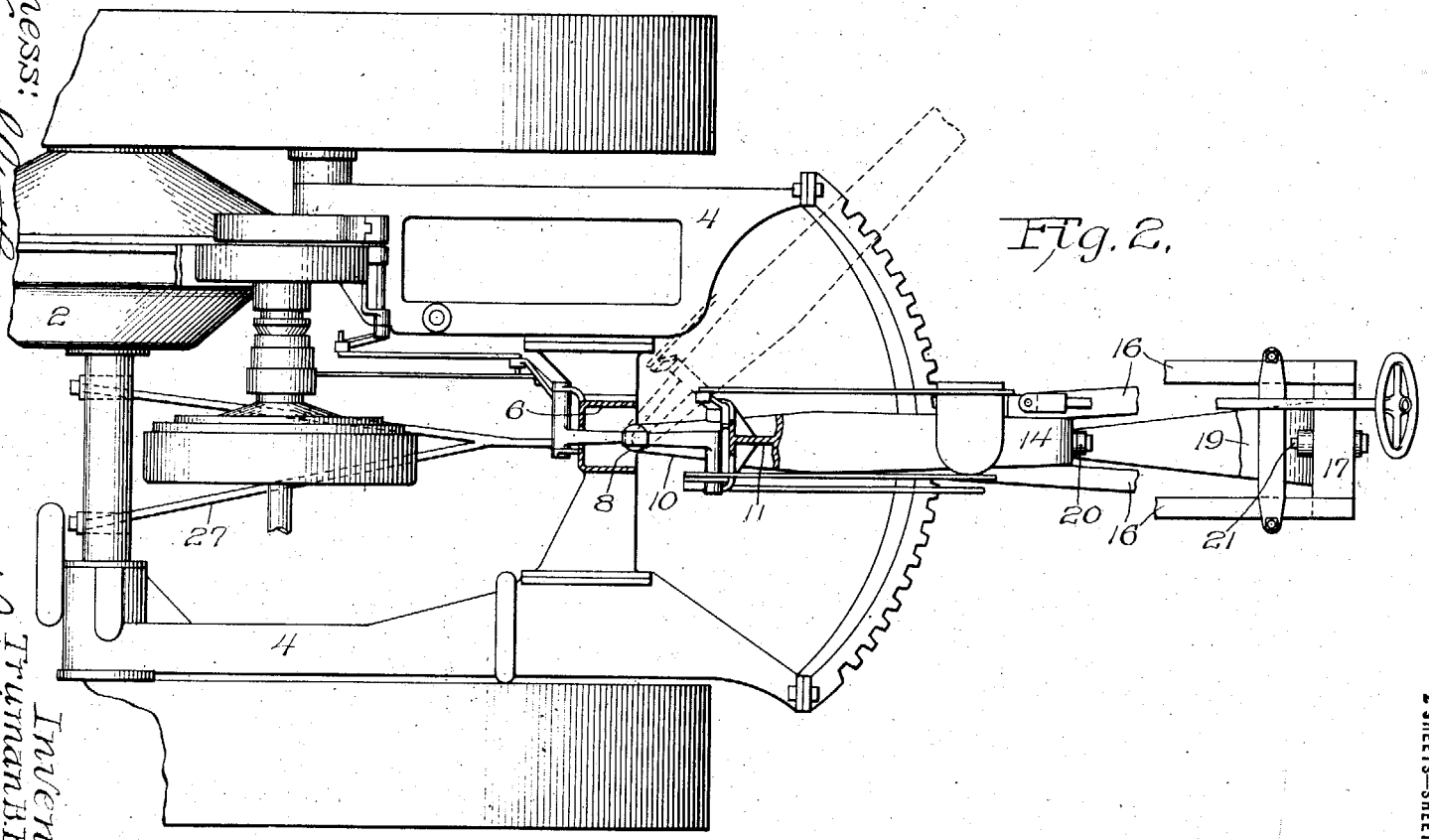
Witness:
Harry S. Gaither
Inventor:
Truman B. Funk
by L. C. Shoub
Attys.

UNITED STATES PATENT OFFICE.

TRUMAN B. FUNK, OF MOLINE, ILLINOIS, ASSIGNOR TO MOLINE PLOW COMPANY, OF MOLINE, ILLINOIS, A CORPORATION OF ILLINOIS.

DRAFT APPLIANCE FOR TRACTORS.

14,985. Specification of Reissued Letters Patent. Reissued Nov. 16, 1920.

Original application filed June 23, 1915, Serial No. 35,784. Divided and application filed May 3, 1916, Serial No. 95,091. Original No. 1,289,724, dated December 31, 1918. Application for reissue filed June 18, 1920. Serial No. 390,025.

*To all whom it may concern:*

Be it known that I, TRUMAN B. FUNK, a citizen of the United States, residing at Moline, county of Rock Island, Illinois, have invented new and useful Improvements in Draft Appliances for Tractors, of which the following is a specification.

This invention relates to draft appliances designed for use in connection with a tractor of the kind now being extensively used for plowing and other agricultural purposes.

The object of the invention is to so design the draft appliances that they will fit a tractor for interchangeable use with plows, or other ground working implements, and so that adequate provision will be made for resisting the torque or the downward thrust of the rear end of the tractor, due to the operation of the engine, and so that the trailing implement may adapt itself by tilting or rocking on a horizontal axis to inequalities of the surface of the ground.

A further object of the invention is to so arrange the draft appliance that a low down draft connection below the axis of the wheels will be afforded, which better adapts the tractor for use in connection with most of the ground working implements for which it is intended. Further objects are to so construct the connections that they will be strong and durable, and at the same time well fitted for employment with a diverse line of implements.

Further objects and uses of the invention will appear from a detailed description of the invention which consists in the features of construction and combinations of parts hereinafter described and claimed.

In the drawing:

Figure 1 is a sectional view through the tractor, showing the draft appliance of the present invention in side elevation; and Fig. 2 is a top or plan view of the same.

The draft features constituting the present invention are applied to a tractor having tractor wheels 1 driven by means of an engine 2 and suitable gearing connections 3. The engine and associated parts are carried by a frame 4, and are preferably mounted in advance of the axle 5, so that the weight of the engine will in a measure counter-balance the weight of the draft appliances and assist the latter in overcoming the torque of the engine. The frame 4, at its rear end, terminates in a standard 6 provided, at its top and bottom, with pivot mountings 7 and 8 respectively, which latter receive the upper and lower ends 9 and 10 of a vertically arranged yoke 11, being pivoted to the mountings 7 and 8 by means of vertical pivot pins 12, or other suitable pivotal appliances. The vertical yoke 11 constitutes the bifurcated end of a Y-shaped casting, the stem 13 of which projects to the rear and terminates in a depending arm 14 provided, at its end, with a horizontal pivot bearing 15. The stem 13 of the yoke is channeled on each side, as shown, and receives the forward ends of a pair of beams 16 one on each side of the stem 13, and the beams, at their rear ends, diverge from one another, as shown in Fig. 2, and are connected, at the rear ends, to a bridge plate 17 provided on its under side in the center with a pivot bearing 18 in horizontal alinement with the pivot bearing 15, the arrangement being one which affords a very strong and rigid rearward connection for the draft appliances which particularly form the subject matter of the present invention.

The pivot bearings 15 and 18 afford mountings for the forward and rear ends of a draft yoke 19, the ends of which are bifurcated to embrace the pivot bearings 15 and 18 with which they are connected by means of horizontal pivots 20 and 21 respectively, the arrangement being one which maintains the draft yoke in rigid vertical alinement with the beams 16 and which permits a sufficient degree of lateral or tilting movement on a horizontal axis to compensate for the rocking or oscillating motions of the trailing implement, due to inequalities in the surface of the ground.

The draft yoke 19, in its center, is bolted or otherwise detachably connected with the tongue 22, pole, or other available front portion of a trailing implement, not shown, such as a plow, cultivator, harrow, or other device, with which the tractor is associated.

The yoke 11 is also channeled or otherwise fitted to receive the upper end of a draft bar 23, the lower end of which is provided with a series of holes 24 any one of which is adapted to furnish a connection for a draft rod 25 connected at its rear end, with the draft yoke 19, and provided with a turn buckle, or the like, 26, for regulating the length of the draft rod to compensate for changes in its point of connection. The draft bar 23 is also, through forwardly extending draft connections 27, secured to the engine casing, or other available portion of the tractor, so as to afford the draft bar sufficient resistance to withstand the pull and strain to which it is subjected. The beams 16, in conjunction with the bridge plate 17, furnish a rear or articulated framework for the tractor and serve as a mounting for the controlling devices.

The arrangement is one which affords a very rigid connection between the tractor and the trailing implement, which is important for the reason that the rear end of the tractor will be supported upon the trailing implement at a considerable distance from the tractor wheels, so that the connections must be of a character which will resist strains in a vertical direction and at the same time afford the horizontal tilting movement required in steering the tractor and in accommodating the tilting or tipping movements of the trailing implement in riding over rough ground.

The draft yoke 19 is employed in connection with low down machines, such as harrows, for instance, but for high draft machines, such as cultivators, hay rakes, etc. the yoke may be dispensed with and a connection made directly between the tongue or pole of the machine and the horizontal pivot mountings 15 and 18, in which case the draft rod 25 will likewise be dispensed with.

The advantages of the invention will be obvious from an inspection of the drawings. The tractor is a compact two-wheeled unit controlled by an operator seated preferably on the device to be drawn. Between the operator and the power unit is a steering and coupling frame or reach that stabilizes the tractor, enables it to be steered, and permits it to be readily connected to a variety of devices. The effective draft connection may be high or low depending upon the character of the device that is drawn and it is arranged to secure movement about both a vertical and a horizontal axis so that the connection is a flexible one that permits the device that is drawn to adapt itself to inequalities in the surface of the ground. The controls for the tractor are carried by the steering or coupling frame and swing with it. They are always in position to be manipulated by an operator seated near the rear of the coupling frame.

I claim:

1. In a machine of the character described, the combination of a front power unit, interchangeable trailing implements, a draft beam pivotally connected to the power unit at its forward end on a vertical axis to permit only lateral swinging motion, and a horizontal pivotal connection between the draft beam and the trailing implements, the draft beam extending over the horizontal pivot.

2. In a machine of the character described, the combination of a front power unit, interchangeable trailing implements, a draft beam pivotally connected to the power unit at its front end on a vertical axis to permit only lateral swinging motion, and longitudinal pivotal connections between the draft beam and the trailing implements extending forwardly and rearwardly from the end of the latter.

3. In a machine of the character described, the combination of a front power unit, a rearwardly extending draft beam pivotally connected therewith at its forward end on a vertical axis to permit lateral swinging motion, and a longitudinal pivotal connection carried by the draft beam and adapted to pivotally connect the latter with the underlying front portion of a trailing implement, a draft bar downwardly extending from the draft beam, and a draft rod rearwardly extending therefrom and affording means for imparting draft to the trailing implement at a point below the longitudinal pivotal mounting therefor, substantially as described.

4. In a machine of the character described, power mechanism, a draft beam pivotally connected therewith to permit lateral swinging motion, a draft yoke pivoted to said draft beam on a horizontal axis, means for connecting a trailing implement to said draft yoke, a draft rod connected with said yoke at a point below its pivot mounting, a depending draft bar fitted for adjustable connection of the draft rod, and a connection between the draft bar and the forward portion of the mechanism for imparting the draft there-through, substantially as described.

5. In a machine of the character described, the combination of a front power unit, a rearwardly extending draft beam pivotally connected therewith at its forward end on a vertical axis to permit lateral swinging motion, and front and rear longitudinal pivotal connections carried by the draft beam and adapted to pivotally connect the latter with the underlying front portion of a trailing implement, a draft bar downwardly extending from the draft beam, and a draft rod rearwardly extending therefrom and affording means for imparting draft to the trailing implement at a point below the longitudinal pivotal mounting therefor, substantially as described.

6. In a machine of the character described, a wheeled power mechanism, a draft beam swivelly connected to said power mechanism by a vertical pivot, means for connecting an implement to said beam consisting in part of a yoke pivotally connected with said draft beam by longitudinal pivots, a draft bar downwardly extending from the draft beam, a connection between said draft bar and said yoke, and a connection from the power mechanism to said draft bar below the axial line of said power mechanism, substantially as described.

7. In a machine of the character described, a wheeled power mechanism consisting in part of a pivot standard, a vertically disposed yoke pivoted at its upper and lower ends to the pivot standard and adapted to swing laterally, a draft beam rigidly connected to said yoke and extending rearwardly therefrom, a draft bar depending from said yoke, and provided at its lower end for adjustable connection, a draft yoke having its forward and rear ends pivoted in horizontal alinement below the draft beam, means for detachably connecting a trailing implement to said yoke, a draft rod having its rear end connected to said yoke and its forward end adjustably connected to the draft bar, and a connection between the draft bar and the power mechanism, substantially as described.

8. In a machine of the character described, a wheeled power mechanism consisting in part of a pivot standard, a vertically disposed yoke pivoted at its upper and lower ends to the pivot standard and adapted to swing laterally and terminating at its rear end in a depending arm furnishing a horizontal pivot mounting, a pair of draft beams rigidly secured on opposite sides of the yoke and rearwardly extending therefrom a bridge plate connecting the rear ends of said beams and provided with a pivot mounting in alinement with the arm, a yoke having its forward and rear ends pivoted to said pivot mountings, and a trailing implement connected to said yoke, substantially as described.

9. In a machine of the character described, a wheeled power mechanism consisting in part of a pivot standard, a vertically disposed yoke pivoted at its upper and lower ends to the pivot standard and adapted to swing laterally and terminating at its rear end in a depending arm furnishing a horizontal pivot mounting, a pair of draft beams rigidly secured on opposite sides of the yoke and rearwardly extending therefrom, a bridge plate connecting the rear ends of said beams and provided with a pivot mounting in alinement with the mounting on the arm, a yoke having its forward and rear ends pivoted to said pivot mountings, a trailing implement connected to said yoke, a draft bar depending from the vertically pivoted yoke, a draft rod connecting said bar with the horizontally pivoted yoke, and a connection between said bar and power mechanism, substantially as described.

10. In a machine of the character described, a wheeled power mechanism consisting in part of a pivot standard, a vertically disposed yoke pivoted at its upper and lower ends to the pivot standard and adapted to swing laterally and terminating at its rear end in a depending arm furnishing a horizontal pivot mounting, a pair of draft beams rigidly secured on opposite sides of the yoke and rearwardly extending therefrom, and a bridge plate connecting the rear ends of said beams and provided with a pivot mounting in alinement with the arm, substantially as described.

11. In a machine of the character described, a wheeled power mechanism consisting in part of a vertical pivot standard, a yoke vertically pivoted at its upper and lower ends to said standard and furnishing a rearwardly extending stem terminating in a depending arm fitted to receive a horizontal pivot, the stem being channeled on its sides, a pair of draft beams having their forward ends fitted within said channels and rigidly secured to the stem of the yoke, a bridge plate connecting the rear ends of the beams and fitted to furnish a mounting for a horizontal pivot in alinement with the pivot mounting afforded by the depending arm, and a connection for a trailing implement pivoted to the pivot mountings last mentioned, substantially as described.

12. In a machine of the character described, the combination of a front power unit, an interchangeable trailing implement associated therewith, a draft beam having its forward end vertically pivotally connected to the power unit at a point to the rear of the axial center of the power unit to permit the beam to have only lateral swinging motion, and a horizontal pivotal connection between the draft beam and the associated trailing implement, the draft beam extending over the horizontal pivot.

13. In a machine of the character described, the combination of a front power unit, an interchangeable trailing implement associated therewith, a draft beam having its forward end vertically pivotally connected to the power unit at a point to the rear of the axial center of the power unit to permit the beam to have only lateral swinging motion, and horizontal pivotal connections between the draft beam and the trailing implement, the draft beam extending over said horizontal pivots.

14. In a machine of the character described, the combination of a front power unit, an interchangeable trailing implement, a draft beam overlying the forward end of the trailing implement and pivotally connected to the power unit at its forward end on a vertical axis to permit only lateral swinging motion, and a horizontal pivotal connection between the draft beam and the underlying trailing implement.

15. In a machine of the character described, the combination of a front power unit, an interchangeable trailing implement, a draft beam overlying the forward end of the trailing implement and pivotally connected to the power unit at its forward end on a vertical axis to permit only lateral swinging motion, the pivotal point being to the rear of the axial center of the power unit, and a horizontal pivotal connection between the draft beam and the underlying trailing implement.

16. A tractor having a power plant, propulsion mechanism including two forward driving wheels, and a steering unit connected to the tractor to swing about a substantially vertical axis, said unit having mechanism associated therewith to provide a high connection to a high draft device or a low draft connection to a low draft device with the device free to swing in either case about a substantially longitudinal, horizontal axis relative to the tractor to adapt itself to inequalities in the surface of the ground.

17. A tractor having a power plant, driving mechanism supported by two forward driving wheels, and coupling means for connecting the tractor to a wide variety of devices to be drawn, said means being connected to the tractor so as to extend rearwardly therefrom relatively high above the ground to provide a high connection to a high draft device and having mechanism associated therewith to provide a low connection to a low draft device, the construction being such that the drawn device is free to swing in either case about a substantially longitudinal, horizontal axis relative to the tractor to permit it to adapt itself to inequalities in the surface of the ground.

18. A tractor adapted to be readily connected to a wide variety of devices to be drawn, comprising a power plant, driving mechanism including two forward drive wheels, and a coupling unit for connecting the tractor to a device to be drawn, said unit including a member extending rearwardly relatively high above the surface on which the tractor is resting, control and steering mechanism supported by said member so as to be readily available for operation from a position on the device to be drawn, said unit being constructed so that the device to be drawn may move relatively to the tractor about a substantially vertical axis and about a substantially longitudinal, horizontal axis.

19. A tractor having a power plant, driving mechanism including two forward drive wheels, a rearwardly extending steering frame, means connected to the steering frame so as to have a horizontal axis of oscillation above the axis of the drive wheels to enable the tractor to be connected to a wide variety of devices and to permit the devices to swing relative to the tractor about a substantially longitudinal, horizontal axis to accommodate for inequalities of ground surface without straining the machine, and control connections for the tractor extending rearwardly from the tractor and arranged to swing about substantially the same axis as the steering frame so as to be readily available for manipulation by an operator seated on a drawn device.

20. A tractor adapted to be readily connected to a wide variety of devices to be drawn, comprising a power plant, driving mechanism including two forward drive wheels, a yoke pivoted to the tractor to swing about a substantially vertical axis for steering purposes, a beam connected to the yoke and extending rearwardly, tractor controls and steering means supported by said beam, and draft connections associated with said beam for connecting the tractor to a device to be drawn, said beam and connections being arranged so that the drawn device is free to move relative to the tractor about a substantially longitudinal, horizontal axis.

21. A tractor having propulsion mechanism including two forward driving wheels, a rearwardly extending steering frame pivoted to the tractor to swing about a substantially vertical axis for steering purposes, and draft connections associated with the steering frame and extending downwardly to be connected with a device to be drawn and having horizontal, pivotal connection with the frame to permit tilting movement of the devices drawn.

22. A tractor adapted to be connected to a wide variety of devices, comprising a power plant, propulsion mechanism including two forward drive wheels, a coupling unit including a yoke pivoted to the tractor by two separated pivots and having a rearwardly extending portion, a draft device extending downwardly from said unit and arranged to transmit the draft to devices to be drawn, the construction of the unit being such that the drawn device is free to move about a longitudinal, horizontal axis relative to the tractor.

23. A tractor adapted to be connected to a wide variety of devices, comprising a power plant, propulsion mechanism including two forward drive wheels, a coupling unit including a yoke pivoted to the tractor to swing about a substantially vertical axis, a beam extending rearwardly from said yoke, and two separated pivotal connections carried by said beam for attachment to a device to be drawn.

24. A tractor adapted to be connected to a wide variety of devices, comprising a power plant, propulsion mechanism including two forward drive wheels, a coupling unit including a yoke pivoted to the tractor to swing about a substantially vertical axis for steering purposes, a beam extending rearwardly from the yoke, steering connections between the beam and the tractor, steering control means and tractor control mechanism carried by said beam and available for manipulation near the rear thereof, a plurality of bell cranks carried by said yoke and arranged to transmit the motion of the tractor controls forward to the tractor, and draft connections carried by said coupling means for flexible attachment to an implement.

25. A tractor adapted to be connected to a wide variety of devices, comprising a power plant, propulsion mechanism including two forward drive wheels, a coupling unit pivoted to the tractor on a substantially vertical axis to swing in a horizontal plane relatively high above the ground, said unit including connections for a high draft device such as a corn cultivator and including mechanism to provide a low draft connection to a low draft device such as a plow.

26. A two wheel tractor of the unstable type comprising a power unit, driving mechanism, coupling means pivoted to the tractor to swing about a substantially vertical axis for steering purposes, said means including a rearwardly extending beam located relatively high above the ground so that it may be connected to a high draft implement such as a corn cultivator, and tractor controls of a semi-rigid type extending rearward from said tractor and arranged to swing relative thereto and to be readily available for manipulation from the normal position of an operator on the implement.

27. A two wheel tractor of the unstable type comprising a power plant, driving mechanism, coupling means pivoted to the tractor to swing about a substantially vertical axis for steering purposes, said means including a rearwardly extending beam located relatively high above the ground so that it may be connected to a high draft implement such as a corn cultivator, and tractor controls and steering means supported by said beam so as to be readily available for manipulation from the normal position of the operator on the implement.

28. A two wheel tractor of the unstable type adapted to be readily connected to a wide variety of devices and having a power plant, propulsion mechanism, and coupling means for stabilizing the tractor and for readily connecting it to various devices to be drawn, said means being pivoted to the tractor to swing about a substantially vertical axis and including draft connections pivoted to said means to swing about a substantially longitudinal, horizontal axis.

29. A two wheel tractor of the unstable type having a power plant, driving mechanism, and a coupling unit for connecting the tractor to various implements to be drawn to transmit the draft of the tractor to such implement, to provide for steering, and to carry the controls for the tractor so that they may be manipulated from a position on the implement, said unit being pivoted to the tractor about a substantially vertical axis for steering purposes and provided with connections to an implement arranged to swing about a substantially longitudinal, horizontal axis to permit tilting of such implement.

30. A two wheel tractor of the unstable type having a power plant, driving mechanism, and coupling means for steering, stabilizing and connecting purposes pivoted to the tractor to swing in a horizontal plane relatively high above the ground, said means having connections associated therewith so that it may be attached to a high draft device by a high draft connection or to a low draft device by a low draft connection.

31. A two wheel tractor of the unstable type having a main frame, coupling means for connecting the tractor to a device to be drawn comprising a yoke pivoted to the tractor to swing about a vertical axis, a rearwardly extending beam carried by said yoke and means pivoted to said beam to swing on a horizontal axis and arranged to be connected to the device to be drawn.

32. A two wheel tractor of the unstable type comprising a main frame, a connecting device including a rearwardly extending member having a yoke formed at one end thereof the arms of which are pivotally connected with the main tractor frame, and a controlling unit adjustably mounted on said rearwardly extending member including a steering gear and engine control connections.

33. A two wheel tractor of the unstable type having a power plant, driving mechanism, a coupling frame pivoted to the tractor to swing about a substantially vertical axis, tractor controls extending rearwardly from the tractor for manipulation from a device to be drawn and arranged to swing about a vertical axis substantially coincident with the axis of the coupling means, and a connecting device pivoted to the coupling frame on a longitudinal, horizontal axis.

34. The combination with a two wheel tractor of the unstable type, of an unstable implement and means for connecting the tractor and implement to combine the two into a stabilized unit, said means including a steering frame pivoted to the tractor to swing about a vertical axis in a plane relatively high above the ground and means associated with the frame for connection to the implement arranged to transmit the draft to the implement by a relatively low draft connection and at the same time permit the implement to move relative to the tractor about a substantially, longitudinal, horizontal axis so that the implement may adapt itself to inequalities in the surface of the ground without straining the connection with the tractor.

35. A two wheel tractor of the unstable type having drive wheels, a power plant mounted forward of the drive wheels, a coupling unit positioned to the rear of the drive wheels and counterbalanced by the power plant, said coupling unit being pivoted to the tractor to swing about a substantially vertical axis for steering purposes and being arranged to be connected to either a high or a low draft device with the connection free to swing about a substantially longitudinal, horizontal axis, and control and steering means carried by the coupling unit and arranged to swing therewith so as to be readily available for operation from a position near the rear of the coupling unit.

36. A two wheel tractor having drive wheels, a power plant mounted forward of the axis of the drive wheels, coupling means connected to the tractor positioned to the rear of the axis of the drive wheels so as to be counter-balanced by the power plant and arranged to be readily connected to various devices to be drawn for stabilizing, steering and controlling the tractor, and control and steering connections carried by the coupling means so as to be always readily available for manipulation near the rear of said coupling means.

37. A two wheel tractor of the unstable type having a power plant, driving mechanism, and a coupling and steering unit for connecting the tractor to a device to be drawn to combine it with the tractor into a stabilized unit, said coupling unit being pivoted to the tractor to swing about a substantially vertical axis for steering purposes and having rearwardly extending portions located relatively high above the ground so that the unit can be coupled to a high-draft device such as a corn cultivator, steering connections between the unit and tractor, steering control means and tractor controls carried by the unit and available for manipulation from a position on the device that is drawn, said tractor controls being arranged to extend forward to the tractor past the pivot of the coupling unit of the tractor so that movements of the unit will not disturb the controls, and draft connections associated with said coupling unit for connecting it to the device that is drawn so as to permit the device to move relative to the tractor about a substantially longitudinal, horizontal axis.

38. A two wheel tractor of the unstable type comprising a power plant, driving mechanism, coupling means pivoted to the tractor to swing about a substantially vertical axis for steering purposes, mechanism for connecting said means to an implement so as to permit the implement to move relative to the tractor about a substantially longitudinal, horizontal axis, and tractor controls and steering means extending rearward from said tractor and pivoted so as to swing about an axis substantially coincident with the axis of the coupling means, said tractor controls and steering means being readily available for manipulation from the normal position of an operator on the device that is drawn.

39. A tractor of the unstable type having a power plant, propulsion mechanism supported by two forward drive wheels, a coupling frame for connecting the tractor to a variety of devices to be drawn to stabilize the tractor, and separate connecting mechanism for transmitting the draft of the tractor to the drawn device.

40. A tractor of the unstable type having a power plant, propulsion mechanism supported by two forward drive wheels, a coupling frame for connecting the tractor to a variety of devices to be drawn to stabilize the tractor, separate connecting mechanism for transmitting the draft of the tractor to the drawn device, and means for steering and for controlling the tractor from the drawn device.

41. A tractor of the unstable type having a power plant, propulsion mechanism supported by two forward drive wheels, coupling means for connecting the tractor to a variety of devices to be drawn to stabilize the tractor, and separate connecting mechanism for transmitting the draft of the tractor to a drawn device, said means and mechanism being arranged so that the drawn device is free to tilt about a longitudinal, horizontal axis relative to the tractor.

42. A tractor of the unstable type having a power plant, propulsion mechanism supported by two forward drive wheels, coupling means for connecting the tractor to a variety of devices to be drawn to stabilize the tractor, means for loosely connecting the rear end of the coupling means to a drawn device, and separate mechanism for transmitting the draft of the tractor to the drawn device.

TRUMAN B. FUNK.